(12) United States Patent
Hadzic (10) Patent No.: US 8,693,506 B2
(45) Date of Patent: Apr. 8, 2014

(54) TRANSPARENT CLOCK ADAPTOR FOR A NETWORK DEVICE

(75) Inventor: Ilija Hadzic, Millington, NJ (US)

(73) Assignee: Alcatel Lucent, Paris (FR)

( * ) Notice: Subject to any disclaimer, the term of this patent is extended or adjusted under 35 U.S.C. 154(b) by 382 days.

(21) Appl. No.: 12/917,852

(22) Filed: Nov. 2, 2010

(65) Prior Publication Data

US 2012/0106576 A1    May 3, 2012

(51) Int. Cl.
*H04J 3/06* (2006.01)

(52) U.S. Cl.
USPC ........... 370/503; 370/352; 370/354; 370/498; 368/46

(58) Field of Classification Search
USPC .......................... 375/354–376; 713/500–502
See application file for complete search history.

(56) References Cited

U.S. PATENT DOCUMENTS

| | | | | |
|---|---|---|---|---|
| 7,251,199 | B2 * | 7/2007 | Eidson | 368/46 |
| 7,573,914 | B2 * | 8/2009 | Ilnicki et al. | 370/519 |
| 8,064,485 | B1 * | 11/2011 | Montini et al. | 370/503 |
| 2006/0222129 | A1 | 10/2006 | Hadzic et al. | |
| 2007/0237146 | A1 | 10/2007 | Hadzic et al. | |
| 2008/0298398 | A1 * | 12/2008 | Eidson | 370/503 |
| 2010/0100759 | A1 * | 4/2010 | Blixt et al. | 713/502 |
| 2010/0158051 | A1 | 6/2010 | Hadzic et al. | |
| 2010/0158181 | A1 | 6/2010 | Hadzic | |
| 2010/0158183 | A1 | 6/2010 | Hadzic et al. | |
| 2011/0051754 | A1 * | 3/2011 | Lansdowne | 370/503 |

FOREIGN PATENT DOCUMENTS

WO PCT/US2011/054567    6/2011

OTHER PUBLICATIONS

MEF8, "Implementation Agreement for the Emulation of PDH Circuits over Metro Ethernet Networks," Metro Ethernet Forum, Oct. 2004, 34 pages.
A. Vainshtein et al., "Structure-Agnostic Time Division Multiplexing (TDM) Over Packet (SAToP)," IETF RFC 4553, Jun. 2006, pp. 1-27.
R.C. Lau et al., "Synchronous Techniques for Timing Recovery in BISDN," IEEE Transactions on Communications, Feb.-Mar.-Apr. 1995, pp. 1810-1818, vol. 43, No. 2-3-4.
David L. Mills, "Network Time Protocol (Version 3) Specification, Implementation and Analysis," IETF RFC 1305, Mar. 1992, 120 pages.

(Continued)

*Primary Examiner* — Anh-Vu Ly
*Assistant Examiner* — Amy Ling
(74) *Attorney, Agent, or Firm* — Ryan, Mason & Lewis, LLP (57) ABSTRACT

A transparent clock adaptor is provided for use with a router, switch or other network device that does not otherwise support transparent clock functionality. The transparent clock adaptor comprises a network port for coupling to a link of a network, a local port for coupling to a port of the network device, transparent clock processing circuitry operative to perform one or more transparent clock timing adjustment operations for each of a plurality of packets including at least one packet arriving in the adaptor via the network port and at least one packet arriving in the adaptor via the local port, and a synchronization interface for communicating with a corresponding synchronization interface of at least one other transparent clock adaptor. The adaptor can operate both as an ingress adaptor for packets arriving over the network link for delivery to the network device and as an egress adaptor for packets arriving from the network device for delivery over the network link.

22 Claims, 5 Drawing Sheets (56) References Cited

OTHER PUBLICATIONS

I. Hadzic et al., "High Performance Synchronization for Circuit Emulation in an Ethernet MAN," Journal of Communications and Networks, Mar. 2005, pp. 1-12, vol. 7, No. 1.
ITU-T G.8261, "Timing and Synchronization Aspects in Packet Networks," International Telecommunication Union (ITU), Telecommunication Standardization Sector, May 2006, 64 pages.
J. Kim et al., "Design of CMOS Adaptive-Bandwidth PLL/DLLs: A General Approach," IEEE Transactions on Circuits and Systems II: Analog and Digital Signal Processing, Nov. 2003, pp. 860-869, vol. 50, No. 11.
ITU-T G.823, "The Control of Jitter and Wander within Digital Networks which are Based on the 2048 kbit/s Hierarchy," International Telecommunication Union (ITU), Telecommunication Standardization Sector, Mar. 2000, 50 pages.
ITU-T G.824, "The Control of Jitter and Wander within Digital Networks which are Based on the 1544 kbit/s Hierarchy," International Telecommunication Union (ITU), Telecommunication Standardization Sector, Mar. 2000, 27 pages.
David L. Mills, "Internet Time Synchronization: The Network Time Protocol," IEEE Transactions on Communications, Oct. 1991, pp. 1482-1493, vol. 39, No. 10.
Ravi Subrahmanyan, "Implementation Considerations for IEEE 1588v2 Applications in Telecommunications," International IEEE Symposium on Precision Clock Synchronization (ISPCS) for Measurement, Control and Communication, Oct. 2007, pp. 148-154.
J.C. Eidson et al., "Sharing a Common Sense of Time," IEEE Instrumentation & Measurement Magazine, Mar. 2003, pp. 26-32, vol. 6, No. 1.
J. Ridoux et al., "Ten Microseconds Over LAN, for Free," International IEEE Symposium on Precision Clock Synchronization (ISPCS) for Measurement, Control and Communication, Oct. 2007, pp. 105-109.
I. Hadzic et al., "On Packet Selection Criteria for Clock Recovery," International IEEE Symposium on Precision Clock Synchronization (ISPCS) for Measurement, Control and Communication, Oct. 2009, pp. 35-40.
"Timing and Synchronization Aspects in Packet Networks," International Telecommunication Union (ITU), Telecommunications Standardization Sector, ITU-T Recommendation G.8261/Y.1361, Apr. 2008, 112 pages.
B. Mochizuki et al., "Improving IEEE 1588v2 Clock Performance Through Controlled Packet Departures," IEEE Communications Letters, May 2010, pp. 459-461, vol. 14, No. 5.
J. Han et al., "Practical Considerations in the Design and Implementation of Time Synchronization Systems Using IEEE 1588," IEEE Communications Magazine, Nov. 2009, pp. 164-170, vol. 47, No. 11.
MC1008 Series, "Pluggable Media Converters," Allied Telesis Datasheet, 2009, 2 pages.
S. Ilnicki et al., "Performance of Transparent Clock Using Modified Gigabit Interface Converters," IEEE 1588 Conference, Oct. 2006, 18 pages.
C. Soviani et al., "Synthesis and Optimization of Pipelined Packet Processors," IEEE Transactions on Computer-Aided Design of Integrated Circuits and Systems, Feb. 2009, pp. 231-244, vol. 28, No. 2.
J-L. Ferrant et al., "Synchronous Ethernet: A Method to Transport Synchronization," IEEE Communications Magazine, Sep. 2008, pp. 126-134, vol. 46, No. 9.
U.S. Appl. No. 12/885,958, filed Sep. 20, 2010, in the name of I. Hadzic et al., and entitled "Frequency Synchronization Using Clock Recovery Loop with Adaptive Packet Filtering."
J.C. Eidson et al., "Spider Transparent Clock," IEEE International Symposium on Precision Clock Synchronization for Measurement, Control and Communication, Sep. 2008, pp. 7-11.
J. Han et al., "A Clock Synchronization System with IEEE 1588-2008 Adapters Over Existing Gigabit Ethernet Equipment," IEEE International Symposium on Circuits and Systems, May-Jun. 2010, pp. 193-196, Paris, France.
J. Han et al., "A Practical Implementation of IEEE 1588-2008 Transparent Clock for Distributed Measurement and Control Systems," IEEE Transactions on Instrumentation and Measurement, Feb. 2010, pp. 433-439, vol. 59, No. 2.

* cited by examiner

TRANSPARENT CLOCK ADAPTOR FOR A NETWORK DEVICE

FIELD OF THE INVENTION

The present invention relates generally to packet-based communication systems, and more particularly to techniques for supporting transparent clocks between network devices of such systems.

BACKGROUND OF THE INVENTION

Synchronization in a packet-based communication system is typically achieved by exchanging timestamped packets between a master device and a slave device, both of which may be located at the edges of a packet network. The slave device typically implements a clock recovery algorithm that processes the timestamps to yield a signal that is used to control a local oscillator in the slave device.

Examples of synchronization techniques of this type are disclosed in U.S. Patent Application Publication No. 2010/0158051, entitled "Method, Apparatus and System for Frequency Synchronization between Devices Communicating over a Packet Network," Publication No. 2010/0158183, entitled "Frequency Synchronization Using First and Second Frequency Error Estimators," Publication No. 2010/0158181, entitled "Frequency Synchronization with Compensation of Phase Error Accumulation Responsive to a Detected Discontinuity," and Ser. No. 12/885,958, filed Sep. 20, 2010 and entitled "Frequency Synchronization using Clock Recovery Loop with Adaptive Packet Filtering," all of which are commonly assigned herewith and incorporated by reference herein.

Packet delay variation (PDV) is a dominant source of noise in many packet-based communication systems. One technique for reducing PDV is to utilize a transparent clock feature in switches, routers and other network devices. This feature generally allows a network device to correct timestamps for packet residency time, which is the time a packet spends in the network device due to processing, queuing and other delays. For example, such a feature is supported by the Precision Time Protocol (PTP) described in IEEE Draft P1588/D2.2, "Draft standard for a precision clock synchronization protocol for networked measurement and control systems," Dec. 2007, which is incorporated by reference herein. This protocol is also commonly referred to as the IEEE 1588v2 protocol. The event messages of the IEEE 1588v2 protocol include SYNC and DELAY_REQUEST messages, and both of these messages provide a field called the correction field.

In the case of the SYNC message, which is sent by the master device to the slave device, the correction field is set to zero when the SYNC message is transmitted by the master device. Each network device in the path traveled by the SYNC message measures the residency time of the message in that device, and adds it to the correction field. When the slave device receives the SYNC message, it subtracts the correction field from an arrival timestamp generated in the slave device to obtain a corrected arrival timestamp.

In the case of the DELAY_REQUEST message, which is sent from the slave device to the master device, the master device copies the correction field as received in the DELAY_REQUEST message into a corresponding DELAY_RESPONSE message that it sends back to the slave device. The slave device can then use the correction field to correct an arrival timestamp which is generated in the master device and also returned to the slave device in the DELAY_RESPONSE message.

One possible implementation of a network device that supports transparent clock functionality is described in J. Han et al., "Practical considerations in the design and implementation of time synchronization systems using IEEE 1588," IEEE Communications Magazine, vol. 47, no. 11, pp. 164-170, November 2009. Other known transparent clock techniques are disclosed in S. Ilnicki et al., "Performance of Transparent Clock Using Modified Gigabit Interface Converter," IEEE 1588 Conference, October 2006.

Providing transparent clock functionality in a new network deployment is a straightforward matter in that the network operator can simply select switches, routers and other devices that support the above-noted IEEE 1588v2 protocol feature. However, a significant drawback of conventional practice is that many existing networks do not support transparent clock functionality because at the time of their deployment, either the IEEE 1588v2 protocol did not exist, network devices that supported the IEEE 1588v2 protocol were not readily available, or the network was originally deployed without the intent to use it with the IEEE 1588v2 protocol. In such situations, the network operator will be understandably reluctant to replace the existing network devices due to cost concerns as well as possible service interruptions. Accordingly, the network operator may be forced to accept the inferior level of synchronization performance that can be achieved without transparent clocks.

SUMMARY OF THE INVENTION

One or more illustrative embodiments of the present invention overcome the above-described drawbacks of conventional practice by providing what is referred to herein as a transparent clock media converter, or more generally a transparent clock adaptor, for use with a network device. The transparent clock media converter can be used to allow an existing switch, router or other network device to support transparent clock functionality, thereby avoiding the need for any upgrade or replacement of the network device itself. This preserves the original investment of the operator in the network devices, while allowing network synchronization performance to be improved in a manner that is significantly less costly and disruptive than device replacement.

In accordance with one aspect of the invention, a transparent clock adaptor is provided for use with a router, switch or other network device that does not otherwise support transparent clock functionality. The transparent clock adaptor comprises a network port for coupling to a link of a network, a local port for coupling to a port of the network device, transparent clock processing circuitry operative to perform one or more transparent clock timing adjustment operations for each of a plurality of packets including at least one packet arriving in the adaptor via the network port and at least one packet arriving in the adaptor via the local port, and a synchronization interface for communicating with a corresponding synchronization interface of at least one other transparent clock adaptor.

The transparent clock adaptor in one or more of the illustrative embodiments operates both as an ingress adaptor for packets arriving over the network link for delivery to the network device, and as an egress adaptor for packets arriving from the network device for delivery over the network link.

The illustrative embodiments can provide the advantages of transparent clocks in existing networks that include network devices that do not support a transparent clock protocol such as IEEE 1588v2. These advantages are provided without the excessive costs or service disruptions that would generally be associated with replacing or upgrading all of the network devices to support the transparent clock protocol.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques and devices for providing transparent clocks in such systems. It should be understood, however, that the invention is not limited to use with the particular types of communication systems and transparent clock techniques and devices disclosed. The invention can be implemented in a wide variety of other communication systems, using alternative circuitry arrangements and process steps. For example, although illustrated in the context of a communication system involving synchronization of master and slave devices communicating over an asynchronous packet network, the disclosed techniques can be adapted in a straightforward manner to a variety of other types of communication systems, including cellular systems, WiMAX systems, Wi-Fi systems, multiple-input multiple-output (MIMO) wireless systems, etc.

Figure 1:
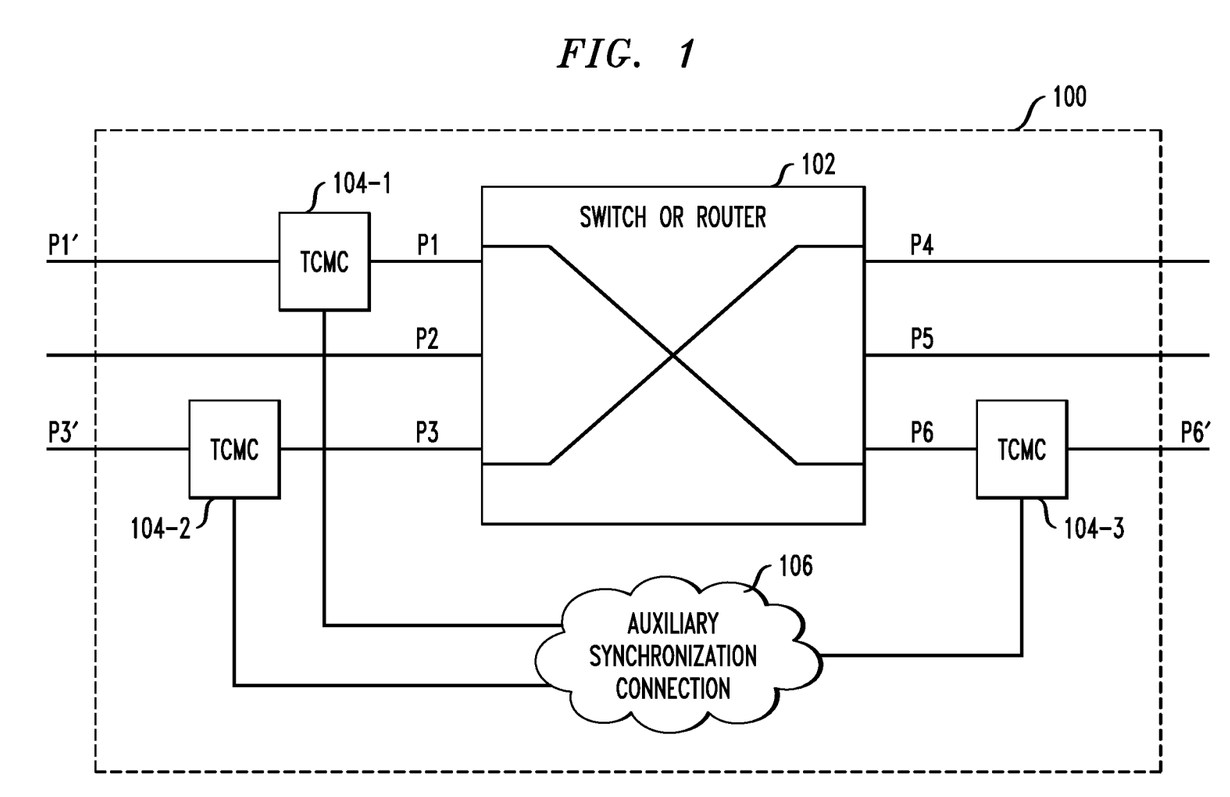
FIG. 1 is a block diagram of a portion of a packet-based communication system including a switch or router and incorporating transparent clock media converters in an illustrative embodiment of the invention.

FIG. 1 shows a portion of a packet-based communication system 100 which includes a network device 102, illustratively a switch or a router, and a plurality of additional devices 104 generally referred to herein as transparent clock media converters (TCMCs). It is assumed that the switch or router 102 is not itself configurable to support a transparent clock protocol, such as the above-described IEEE 1588v2 protocol. As will be described, the TCMCs 104 provide a convenient and efficient way to allow the switch or router 102 to support transparent clocks without incurring the excessive costs and service disruptions that would generally result if the switch or router itself was replaced or upgraded. The TCMCs are illustrative examples of what are more generally referred to herein as "transparent clock adaptors." Such devices may, but need not, incorporate media conversion functionality in addition to transparent clock functionality.

In the following description, the network device 102 will be referred to as a switch for simplicity of description, but it should be understood that the device may alternatively be a router or any other type of network device that can operate in conjunction with one or more TCMCs to support a transparent clock protocol.

The switch 102 as shown in FIG. 1 includes six ports denoted P1 through P6. It is assumed that of these six ports, only ports P1, P3 and P6 are expected to carry timing traffic, such as timing packets associated with the IEEE 1588v2 protocol or other transparent clock protocol. Accordingly, in the present embodiment TCMCs 104-1, 104-2 and 104-3 are installed in front of respective ports P1, P3 and P6, and as will be described below implement the transparent clock functionality on these ports.

The TCMC 104 may generally take a physical form similar to that of a typical media converter, an example of which is described in MC1008 Series, "Pluggable media converter," Allied Telesys Product Datasheet, 2009. However, instead of adapting one type of media to another (e.g., fiber to copper), as in a typical media converter, a given TCMC in the present embodiment is responsible for implementing transparent clock functionality for timing traffic associated with its corresponding port on the switch 102. As noted above, the TCMC may also incorporate conventional media conversion functionality.

The TCMC 104 in the present embodiment includes two ports, one facing away from the switch and referred to herein as the network port, and the other facing the switch and referred to herein as the local port. The TCMC parses the packets that arrive via its network and local ports, in order to identify timing packets (e.g., SYNC and DELAY_REQUEST packets in case of the IEEE 1588v2 protocol). For each timing packet that came in on the network port (going towards the local port), the TCMC records the entry time. For each timing packet that came in on the local port (going towards the network port), the TCMC records the exit time. Before sending the packet out, the TCMC subtracts the entry time from the exit time and adds the difference (i.e., residency time) to the correction field.

A given packet typically exits the switch 102 through a different TCMC 104 than the one through which it entered the switch. Therefore, all of the TCMCs 104-1, 104-2 and 104-3 surrounding the switch 102 are mutually synchronized in time via an auxiliary synchronization connection 106. It should be noted, however, that the TCMCs need not be synchronized to any external time reference. In some embodiments, the auxiliary synchronization connection 106 may also be used to communicate the entry times of packets between TCMCs, because for a given packet the egress TCMC needs to know the entry time (generated by the ingress TCMC) to properly calculate the residency time of that packet. It should be understood, however, that alternative entry time communication techniques that do not require use of the auxiliary synchronization connection 106 may be used in other embodiments. The auxiliary synchronization connection 106 may be a direct wiring connection, or other type of wired or wireless connection.

Figure 2:
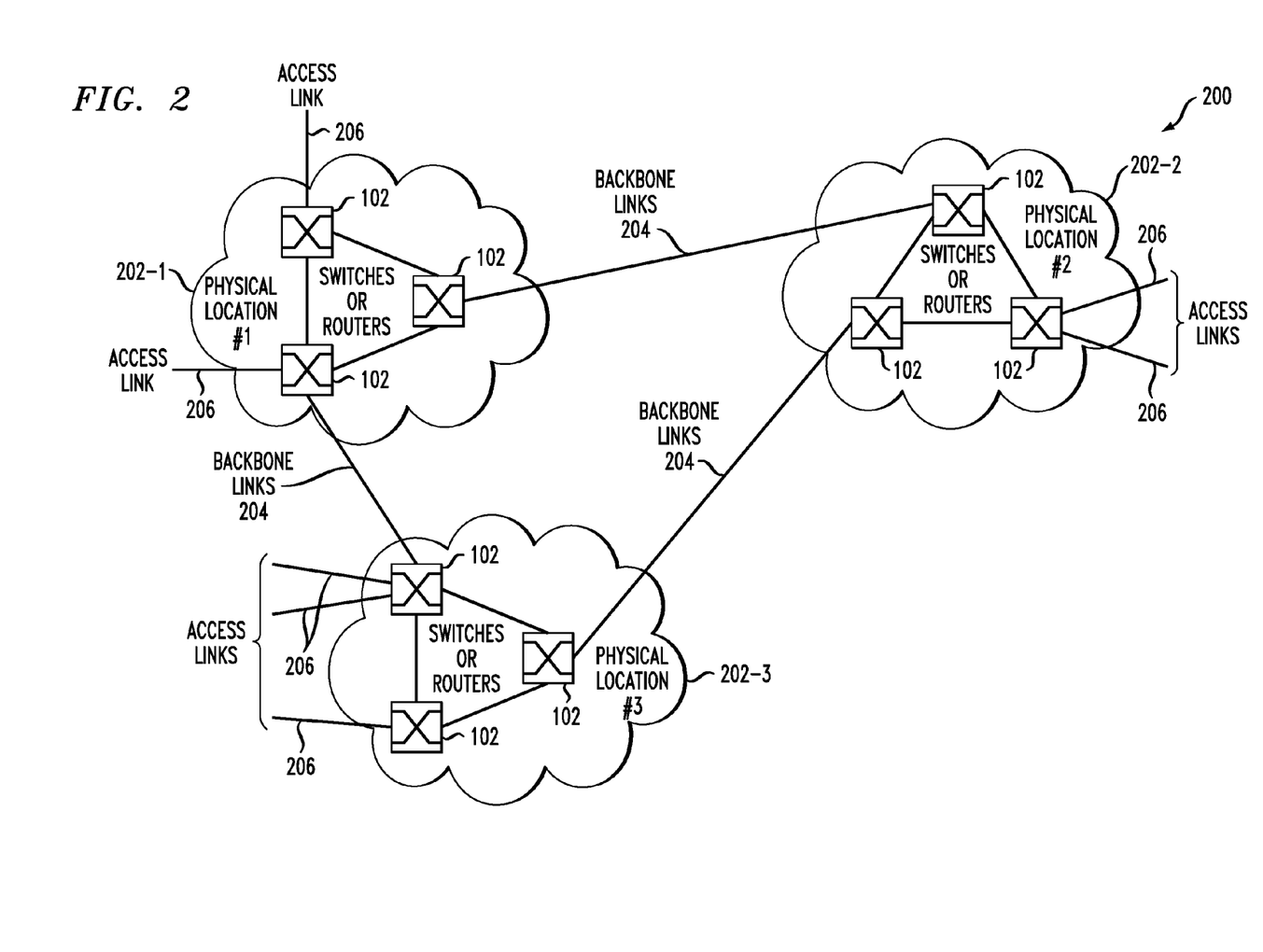
FIG. 2 shows a high level view of a packet-based communication system in which transparent clock media converters may be implemented for multiple networks each at a different physical location in an illustrative embodiment.

FIG. 2 shows an example of a packet-based communication system 200 that includes multiple separate networks 202 each at a different physical location and interconnected by backbone links 204. More specifically, the system 200 includes three separate networks 202-1, 202-2 and 202-3, at respective physical locations 1, 2 and 3. The networks 202 are assumed to be asynchronous packet networks such as Ethernet networks, but may additionally or alternatively comprise other types of networks, in any combination.

Figure 3:
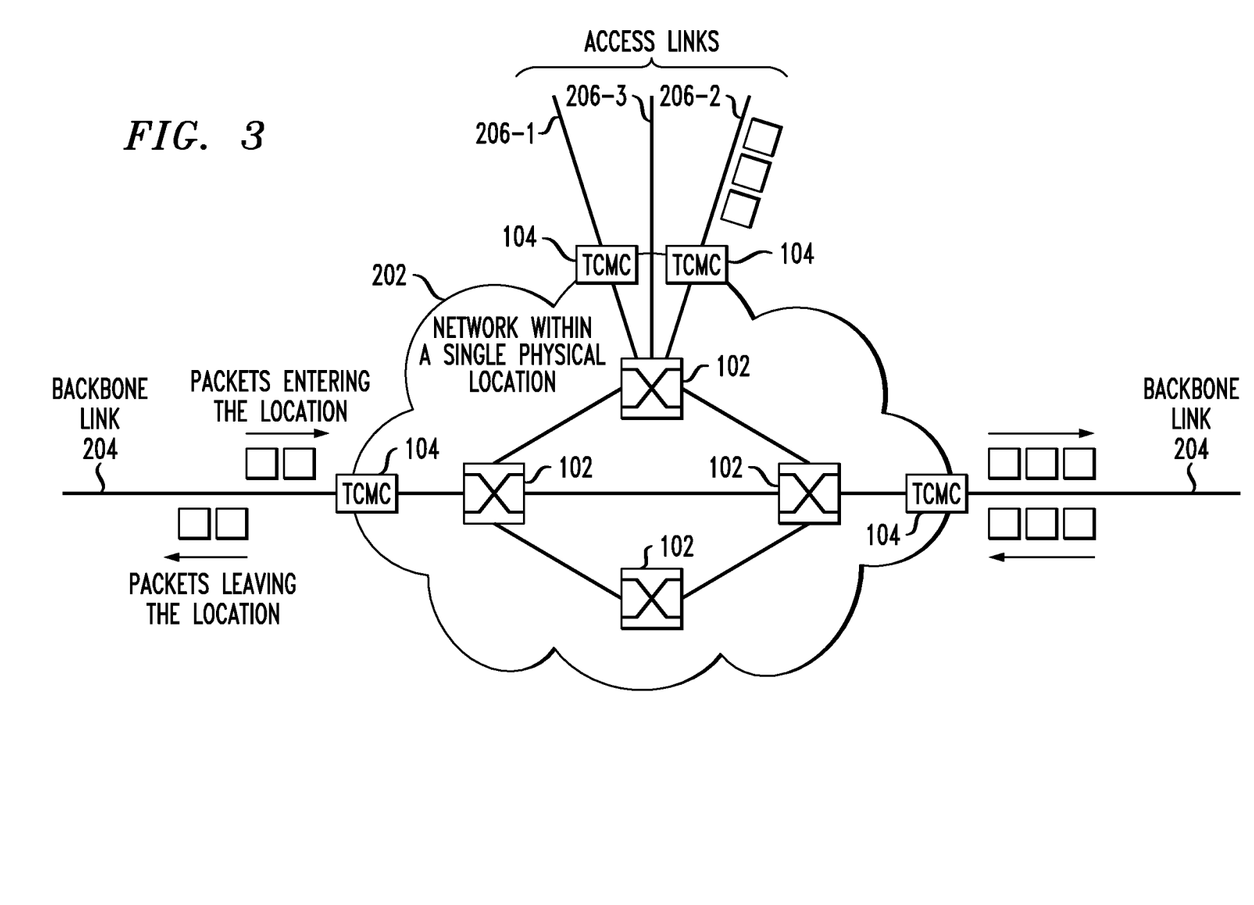
FIG. 3 shows the manner in which transparent clock media converters may be implemented in a given one of the networks of the FIG. 2 system in an illustrative embodiment.

Each network 202 includes multiple switches or routers 102, which as noted above will be referred to as switches for simplicity of description. Some of the switches 102 are at the edges of their respective networks 202 and are accessible from endpoint devices via access links 206. A given endpoint device may comprise, for example, a computer, a wireless service base station, a mobile telephone, or any other type of communication device. It may also be another network that is (technically or administratively) considered not part of the system 200 (e.g., a network that belongs to another operator or a customer's LAN). The endpoint devices and TCMCs are not explicitly shown in this figure, but are assumed to be present in the system 200. A more detailed view of a portion of the system 200 showing one possible arrangement of TCMCs for a given one of the networks 202 is shown in FIG. 3.

It is to be appreciated that the topology of the system 200, including the number of switches at each physical location as well as the number of physical locations, are arbitrary and the system 200 should therefore be considered an illustrative example only. Also, the term "physical location" is intended to be broadly construed. It refers generally to a group of switches that an operator may consider in convenient physical proximity. For an enterprise network, that could be a wiring closet on a floor of an office building. For a carrier network, a physical location can be an entire small building (e.g. central office, data center, etc.) in which the switches are located in a room in a larger building. As will become apparent from the description below, what can be considered a physical location largely depends on how convenient is to provide the auxiliary synchronization connectivity among the TCMCs associated with that location.

The access links 206 in the system 200 are used by subscribers to connect to the corresponding network 202 and to send and receive packets, while the backbone links 204 interconnect the multiple physical locations within the system. The term "subscriber" may refer to any device, system or application that sends packets over one or more of the networks 202 of system 200, and does not necessarily imply any particular business relationship between the entity sending and receiving packets and the operator entity providing the network. By way of example, subscribers in a given embodiment may be mobile telephony system components such as cellular base stations and mobile switching centers that are connected to a backhaul network over the access links.

In these and other embodiments, subscribers may need to send timing packets over the network because the application is synchronous. For example, base stations in a cellular network are often synchronized in frequency and sometimes in time depending on the wireless standard used on the radio interface. Use of transparent clocks will greatly improve the timing performance as seen by the subscribers. If the network at the time of deployment did not implement transparent clocks and the network operator wants to upgrade it to support them, they can do so by installing TCMCs 104.

It is important to note that the TCMCs do not need to be installed at every port of every switch. Instead, TCMCs can be installed on all or most links entering and leaving the network 202 at a particular physical location. FIG. 3 shows an arrangement of this type for one of the networks 202 of system 200. As shown, TCMCs 104 are installed on each of the backbone links 204 coupled to network 202. Also, there are three access links 206-1, 206-2 and 206-3, with TCMCs installed on only two out of three of these access links, namely, links 206-1 and 206-2. The third access link 206-3 is assumed to be a link over which timing traffic will not be sent, and so that link does not include a TCMC.

In other embodiments, alternative techniques may be used to deploy the TCMCs, such as installing TCMCs only at the access links 206 of a given network 202, again assuming that the auxiliary synchronization connection 106 can be practically implemented to connect and synchronize all TCMCs associated with that physical location.

Within a particular physical location, there can be an arbitrary number of switches 102 and a packet can take an arbitrary path. For as long as a timing packet is inside the network 202 associated with a physical location, its residency time grows. Once it leaves the network 202, the egress TCMC 104 calculates the final residency time and adds it to the correction field. It is important that a timing packet does not terminate on any device inside the physical location unless that device is connected to a switch that is coupled to a TCMC. Otherwise the correction field in the packet may be incorrect, which could have adverse consequences to the recovered clock performance.

As mentioned above, the egress TCMC of a given timing packet needs to know the entry time of that packet in order to properly calculate the residency time. The entry time is known by the ingress TCMC, so the entry time is communicated from the ingress TCMC to the egress TCMC. One way for this to be done is for the ingress TCMC to subtract the absolute value of the entry time from the current value of the correction field of the incoming timing packet and overwrite the correction field with the result. So when the timing packet leaves the ingress TCMC and enters the first switch 102 at the associated physical location, its correction field is as follows:

$$\text{Correction\_field\_1} = \text{Correction\_field\_0} - \text{Entry\_time},$$

where Correction_field_0 is the value of the correction field that the timing packet had before it entered the ingress TCMC and Correction_field_1 is the value of the correction field the timing packet has when it exits the ingress TCMC and enters the first switch at the associated physical location. Note that the correction field of such a timing packet does not make sense externally, but this is acceptable because the packet will not terminate on any device at the physical location before being processed by the egress TCMC.

The timing packet eventually reaches the egress TCMC, which locally generates the exit time and adds it to the correction field. So the correction field of the timing packet when it exits the physical location is $$\text{Corection\_field\_2} = \text{Correction\_field\_1} + \text{Exit\_time}.$$

Combining the two equations above gives the following result:

$$\text{Correction\_field\_2} = \text{Correction\_field\_0} + \text{Exit\_time} - \text{Entry\_time}.$$

Thus, the correction field of the timing packet when it leaves the egress TCMC has been properly adjusted for its residency time in the physical location. As noted above, this assumes that the TCMCs at the physical location are synchronized in time via an auxiliary synchronization connection such as connection 106 in FIG. 1. If they were not, then Entry_time and Exit_time would not pertain to the same reference and the residency time would not be properly calculated. This technique of communicating the entry time is referred to herein as the first entry time communication technique.

Alternative techniques can be used to communicate the entry time from the ingress TCMC to the egress TCMC. For example, in a second entry time communication technique, the ingress TCMC can append the entry time to the timing packet, using one or more existing reserved fields, or possibly one or more new proprietary fields. The egress TCMC then subtracts the exit time from the value of the appended entry time and adds the difference to the correction field. One advantage of this technique is that if a packet inadvertently terminates before going through an egress TCMC (e.g., due an error in configuration or any other kind of a temporary glitch), the correction field is still valid, except that it does not include the residency time of the most recent physical location. The packet is therefore still usable, albeit at the expense of degraded performance. If a similar error occurs and the first technique above is used, the correction field is completely corrupted and the packet is probably unusable. The downside of this technique is that fields that temporarily carry the entry time may be deeper in the packet than the correction field. Consequently, longer delay lines would typically be used when implementing the packet editor 406 which will be described in conjunction with FIG. 4.

A third possible entry time communication technique is to send the entry time from the ingress TCMC to the egress TCMC not in a packet, but instead through the auxiliary synchronization connection. For example, the ingress TCMC may generate a hash value from the timing packet content that has a low probability of collision and broadcasts it together with the entry timestamp to all TCMCs in the network 202. The TCMC broadcasts it because it does not know to which port the timing packet will be sent. Each TCMC maintains a table that associates hash fields with entry times. Each time a new broadcast is received an entry is added into the table. When the egress TCMC receives the timing packet, it regenerates the hash and looks up the entry time in the table. The egress TCMC then has all the data needed to calculate the residency time. Once the entry in the table has been consumed, the egress TCMC can remove it.

However, this third entry time communication technique has a number of disadvantages. For example, broadcasts over the auxiliary synchronization connection represent additional traffic that can impact the inter-TCMC synchronization performance and in general use the available bandwidth putting additional burden on the auxiliary synchronization connection. Also, there is a potential race condition between a packet and a timestamp arriving at the egress TCMC. If the packet arrives first, the lookup will fail and the packet may be dropped due to the inability of the TCMC to calculate the correction field. In addition, if one of the switches drops the packet, there will be a stale entry in every egress TCMC. The stale entry will eventually have to be removed either due to timer expiry or when the number of available entries starts running low (in which case the oldest entry should be removed). Furthermore, if a TCMC reboots or power-cycles, it may lose all table entries and consequently drop a large number of consecutive packets. Because of these practical issues, the first two entry time communication techniques described above are preferred over the third.

Figure 4:
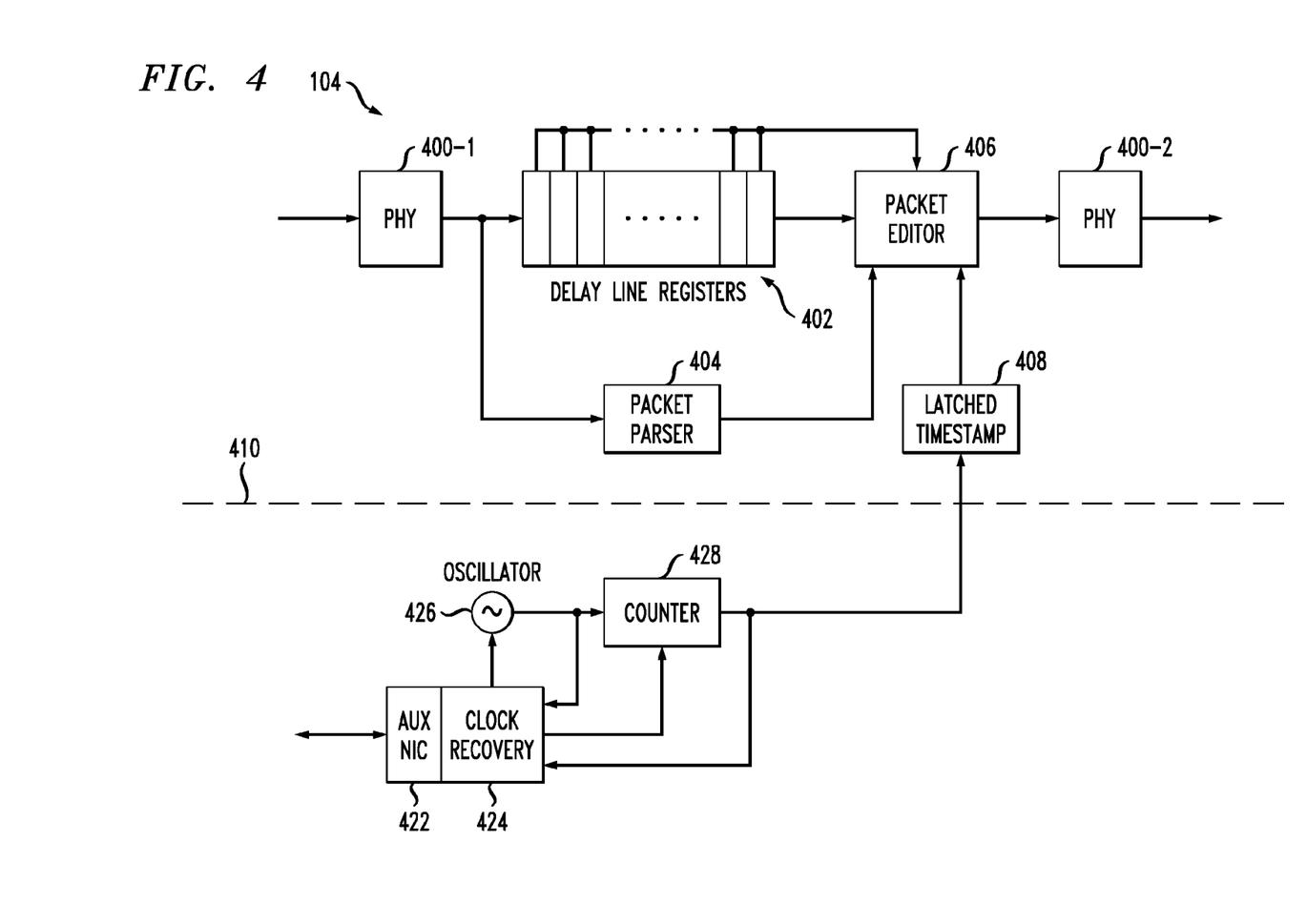
FIG. 4 is a functional diagram of a given one of the transparent clock media converters implemented in the system of FIG. 1, 2 or 3 in an illustrative embodiment.

Referring now to FIG. 4, a more detailed view of a given TCMC 104 is shown. The device is assumed to be bidirectional, but packet flow for only a single direction through the TCMC is illustrated in this functional diagram. Elements 400-1, 400-2, 402, 404, 406 and 408 above dashed line 410 are associated with packet processing in one direction through the TCMC, and it is to be understood that a similar arrangement of elements is included in the TCMC for packet processing in the opposite direction. Although the structure is substantially the same for both of these two paths through the TCMC, the functionality of each is slightly different, and accordingly will be separately described below for the ingress and egress directions. The elements 422, 424, 426 and 428 below the dashed line are common for both directions and thus not replicated in the TCMC. The various elements shown in FIG. 4, or subsets of such elements, may be viewed as examples of what is more generally referred to herein as "transparent clock processing circuitry." Operations performed by these elements or subsets thereof include operations more generally referred to herein as "transparent clock timing adjustment operations." Other types of transparent clock processing circuitry and transparent clock timing adjustment operations may be used in other embodiments.

For the ingress direction, a packet enters the TCMC 104 via physical layer (PHY) device 400-1. The output of the PHY device 400-1 may comprise a bus over which the incoming packet is delivered to the internal circuitry of the TCMC. This bus is typically word-oriented with a word size of 8, 16 or 32 bytes, although other word sizes could be used. The PHY device generates signals from which a pulse that identifies the first word of the packet can be easily derived. That pulse is used to latch the timestamp in register 408. The counter 428 in the figure is a register that contains the current time internal to the TCMC. The counter progresses constantly and is latched into the register 408 on each packet arrival. Thus, the latched timestamp represents the first word arrival time of the most recent packet. At this point, the TCMC does not know whether or not the incoming packet is a timing packet.

The packet moves through a delay line 402 which comprises a group of registers arranged in a pipelined structure. The size of each register is equal to the word size. As packet words enter the delay line, the packet parser 404 analyzes them and looks for the fields that would identify a timing packet. The packet parser includes a finite state machine whose states reflect the expected packet structure and its variations. For example if the system is built for Ethernet, the packet parser would expect 12 bytes of destination address, followed by 12 bytes of source address followed by the packet type field. At that point the packet parser would look for Ethernet type field value of 0x88f7, which signifies IEEE 1588v2 packets. It would continue to search for IEEE 1588v2 message type field and so on. Finally if the packet matches all the criteria it would be declared a timing packet and the indication of the match would be passed to the packet editor 406. On the other hand, if the Ethernet type field value had been 0x8100 indicating a VLAN-tagged packet, the state machine would adapt to look for the message type field deeper in the packet.

When the packet parser 404 indicates a match, the first word of the packet should still be in the delay line 402. The packet continues to shift through the delay line and finally reaches the packet editor 406 which starts to read it. At that time the packet editor has the timestamp available and it knows based on the indication from the packet parser 404 that the packet is a timing packet. As it reads the packet from the delay line, the packet editor modifies the packet fields. In the case of an ingress TCMC, the latched timestamp, which is indicative of the entry time of the packet into the particular physical location, is subtracted from the correction field. This assumes that the TCMC 104 is configured to utilize the first entry time communication technique described above. The packet editor knows where the correction field is relative to the start of the packet, based on information supplied from the packet parser, and so it starts the modification when the correct word comes out of the delay line. The modified packet then leaves the packet editor 406 and is transmitted by the PHY device 400-2 on the right hand side of the figure.

Various techniques for constructing state machines for packet parsing and editing are well known to those skilled in the art, and therefore will not be described in detail herein. For example, techniques for automatic synthesis of state machines are disclosed in C. Soviani et al., "Synthesis and Optimization of Pipelined Packet Processors," IEEE Trans.

Computer-Aided Design, vol. 28, no. 2, pp. 231-244, February 2009. See also U.S. Patent Application Publication No. 2007/0237146, entitled "Methods and Apparatus for Modeling and Synthesizing Packet Processing Pipelines," which is commonly assigned herewith and incorporated by reference herein. It is therefore straightforward to configure a packet parser or packet editor that supports a wide variety of packet encapsulations and packet formats. The above example should be viewed as an illustration only.

Standard combinatorial circuitry may be used to perform the subtraction of the entry time from the correction field in packet editor 406. If that circuitry has a delay that is longer than the clock cycle at which the words are clocked out of delay line 402, the packet parser 404 can look ahead in the delay line (i.e., accessing registers that are further to the left in the pipeline), essentially reading the correction field one or more cycles ahead of the cycle when it is needed. The circuitry that performs the subtraction can then take that many cycles longer to produce the result.

In an embodiment in which the second entry time communication technique described previously is implemented, the packet editor 406 may be configured to replace one or more reserved fields of the packet with the timestamp indicative of the entry time. Alternative techniques, such as appending or inserting a new standard or proprietary field, may be used instead of replacing one or more reserved fields. For example, the IEEE 1588v2 protocol provides a capability of inserting special fields called type-length-value (TLV) fields. The modified packet then leaves the packet editor and is transmitted by the PHY device 400-2 on the right hand side of the figure.

Since the above-described techniques involve modification of packet contents, the packet editor 406 also recalculates the cyclic redundancy check (CRC) field of the modified packet. It should first be determined if the packet came in with a failing CRC. If the packet editor "blindly" recalculated the CRC for such a packet, it could turn a bad packet into good packet, which is undesirable. The packet parser 404 should therefore perform the check and pass the result to the packet editor. If the incoming packet failed the check, the packet editor should intentionally corrupt the CRC at transmission so that the packet remains bad. Such a packet will most likely be dropped by the first switch in the path. Alternatively, the TCMC could be configured with full store-and-forward capability, so as to be able to drop bad packets. However, this would require additional buffering, making the device more complex.

If an arriving packet is not a timing packet, the packet editor 406 does not modify it, but instead simply passes it to the PHY device 400-2. In this case, the CRC is not recalculated, and the latched timestamp is not used.

If the delay line 402 is shorter than the length of a full packet, as is typical, it is sufficient to provide a single register 408 for the latched timestamp because the timestamp will be used before it is overwritten by the next arriving packet. In the case of a longer delay line, a FIFO buffer may be used to store multiple latched timestamps.

The operation of the egress path is very similar to the operation of the ingress path as described above, except that the packet editor 406 works in a slightly different manner. The arriving packet is still parsed in the same way as described above and the exit timestamp is latched. Assuming that the TCMC implements the first technique for communicating entry time, the packet editor reads the words from the delay line 402 and when it reaches the word that carries the correction field it overwrites it with the sum of the latched timestamp and the correction field. The correction field can be read ahead from the delay line as previously described to overcome the delay in the potentially slow combinatorial circuitry that performs the addition.

If the second entry time communication technique is implemented, the packet editor 406 first subtracts the latched timestamp from the entry timestamp in the packet. If the entry time is in a field of the packet which follows the correction field, which would be the case if the reserved fields of IEEE 1588v2 protocol are used, the packet editor looks ahead in the delay line 402. In this situation, the look ahead by the packet editor is inherent to the processing, and not for performance optimization with respect to delay in the combinatorial circuitry as in other cases described above. Suppose, for example, that the correction field is in the rightmost register of the delay line but the entry time is located in a field that comes several words after the correction field. Without the delay line, the packet editor would not have access to the entry time and would not be able to calculate the residency time.

It is therefore important to determine the minimum size of the delay line 402. In the present embodiment, the delay line should be able to accommodate the maximum distance in words between two fields of a packet for which the value of the field that comes earlier in the packet depends on the value of the field that comes later in the packet. For example, if the correction field depends on the entry timestamp and the entry timestamp comes X words after the correction field in the packet, then X is the minimum size of the delay line. If there is some other dependency for which the distance is Y words, then the minimum size of the delay line is the greater of X and Y.

The time reference within the TCMC 104 is generated from the counter 428 that is driven by a local oscillator 426. The local oscillator 426 and the offset of counter 428 are disciplined using clock indications from other TCMCs at the same physical location, as received through an auxiliary synchronization interface 422, which is illustratively implemented as a network interface card (NIC). This ensures that the time is synchronized among all TCMCs at the same physical location. A clock recovery module 424 corrects the oscillator rate and the absolute value of the counter 428. Various options for implementing the auxiliary synchronization connections and details of how the oscillator and counter offset can be disciplined are described below.

As mentioned previously, the auxiliary synchronization connections, which may be wired or wireless connections and may collectively comprise an auxiliary synchronization network, are used to synchronize TCMCs at the same physical location. The present invention does not require any particular implementation of such connections, but a small and dedicated network optimized for synchronization performance may be used in a given embodiment.

By way of example, one possible implementation is to consider that all TCMCs connected to an auxiliary synchronization network are an isolated IEEE 1588v2 domain with an arbitrary time epoch. The TCMCs are connected to each other using either wired (e.g., Ethernet) or wireless (e.g., WiFi) network connections. The connections may be facilitated using small enterprise switches, and these switches may implement IEEE 1588v2 transparent clocks to improve the synchronization performance. Such an arrangement is feasible due to the small size and local span of the auxiliary synchronization network.

The TCMCs 104 can use a standard best-master clock (BMC) selection algorithm to resolve the master-slave relationship, as specified in the IEEE 1588v2 standard. Since all TCMCs are free-running at startup time, they all advertise the same clock quality and clock class. Following performance of the BMC algorithm, an arbitrary TCMC will "win" and become the master for all other TCMCs in the auxiliary synchronization network (i.e., all TCMCs at the given physical location). At this point all other TCMCs will start to track the new master in frequency and phase, as well as adapt their time epoch to the new master. If the current master is removed from the network or if it goes down, the BMC algorithm will be rerun and a new master will be selected. Notice that the time epoch is completely arbitrary, but once the master is selected, the epoch used in the domain becomes that of the selected master. In a different auxiliary network, at a different physical location, the time epoch is different, but that does not impact the overall system operation.

One possible variation to the auxiliary synchronization network described above is to use synchronous Ethernet to distribute the frequency between the TCMCs 104. Synchronous Ethernet is described in, for example, J.-L. Ferrant et al., "Synchronous Ethernet: A method to transport synchronization," IEEE Communications Magazine, vol. 46, no. 9, pp. 126-134, September 2008. Because synchronous Ethernet uses the physical layer to synchronize the frequency, the recovered clock stability is oblivious to the network traffic and typically better than in the case of IEEE 1588v2. The downside is that synchronous Ethernet does not provide time synchronization, so the network still exchanges timing messages that carry the information used to determine the time epoch. Such timing messages could be implemented using IEEE 1588v2 or another transparent clock protocol.

Yet another way to synchronize the TCMCs is to use a mutual synchronization technique in which each TCMC advertises the current time to all other TCMCs in the network and uses the time received from all other TCMCs to discipline its own frequency and time source. Such a technique generally converges to a common time whose accuracy and stability is better than that of any individual clock. The timestamps can be distributed using the IEEE 1588v2 protocol, or another standard or proprietary protocol.

Figure 5:
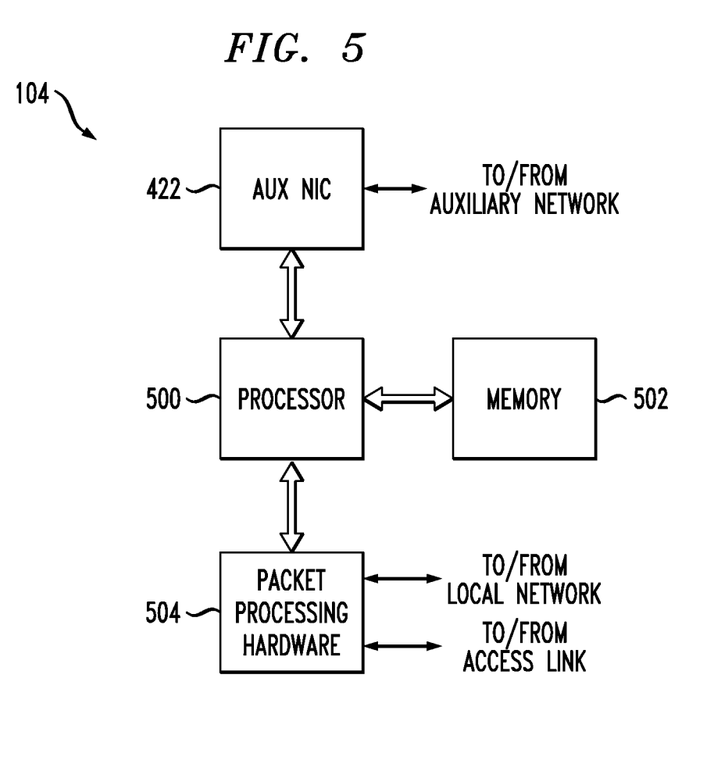
FIG. 5 is a hardware diagram of the transparent clock media converter of FIG. 4 in an illustrative embodiment.

FIG. 5 shows a corresponding hardware diagram of a given TCMC 104 in an illustrative embodiment. The TCMC 104 in this embodiment comprises a processor 500 coupled to a memory 502. The processor 500 is also coupled to the auxiliary NIC 422, which as indicated previously provides a synchronization interface to one or more other TCMCs via an auxiliary network. The TCMC further includes packet processing hardware 504 coupled to the processor 500. The packet processing hardware 504 interfaces with a local network and an access link as indicated in the figure.

The processor 500 may be configured to control the operation of one or more other elements of the TCMC 104 using software stored in the memory 502. For example, one or more elements of the TCMC as shown in the functional diagram of FIG. 4, such as the clock recovery module 424, may be implemented at least in part in the form of software that is executed by the processor 500. Instruction code associated with such software may be stored in the memory 502, which is an example of what is more generally referred to herein as a "computer program product" or a "processor-readable storage medium." Other combinations of hardware, firmware and software may be used in implementing the TCMC or portions thereof.

By way of example, one or more elements of the TCMC 104 may be implemented in the form of one or more integrated circuits. In one possible implementation, the TCMC may comprise a single application-specific integrated circuit (ASIC) which includes the processor 500, memory 502, packet processing hardware 504 and auxiliary network interface 422 of FIG. 5. As another example, the processor and memory may be on one integrated circuit, and the packet processing hardware and auxiliary network interface on one or more other integrated circuits. Numerous other single or multiple integrated circuit arrangements may be used in implementing the invention, and all such arrangements are intended to be encompassed by the general term "transparent clock processing circuitry" as used herein. Such circuitry can also be implemented at least in part using reconfigurable hardware, such as one or more field-programmable gate arrays (FPGAs). For example, an FPGA may be used to implement packet processing hardware 504 in the FIG. 5 embodiment.

It is also to be appreciated that the present invention does not require the use of the IEEE 1588v2 protocol, and can be implemented using other protocols. For example, inter-TCMC synchronization over an auxiliary synchronization network can utilize timing messages compliant with the Network Time Protocol (NTP). NTP is described in D. L. Mills, "Network time protocol (version 3) specification, implementation and analysis," IETF RFC 1305, March 1992, which is incorporated by reference herein.

In an alternative embodiment, a single TCMC may serve as both an ingress TCMC and an egress TCMC for a particular network or network device. Such an arrangement may be used, for example, in the case of a "one-armed" router that receives and transmits packets on the same port but on different VLANs (i.e. makes packets "jump" from one VLAN to the other based on the IP address). In an embodiment of this type, the auxiliary synchronization interface of the TCMC may be eliminated.

It should therefore again be emphasized that the above-described embodiments of the invention are intended to be illustrative only. As indicated previously, the invention is not restricted in terms of the particular configuration of the media converter or other adaptor in which it is implemented. Thus, a given TCMC or other transparent clock adaptor configured in accordance with the invention may include different arrangements of elements or other elements not explicitly shown or described. Also, alternative embodiments of the invention can utilize, for example, different communication system configurations, network configurations, auxiliary synchronization connections, and timing messages than those described above in the context of the illustrative embodiments. Furthermore, the particular assumptions made in the course of describing the illustrative embodiments should not be viewed as requirements, and such assumptions need not apply in alternative embodiments. These and numerous other alternative embodiments within the scope of the following claims will be readily apparent to those skilled in the art.

What is claimed is:

1. A communication system, comprising:
 a plurality of network devices associated with a particular physical location;
 a first transparent clock adaptor coupled to a first one of the network devices and operative to determine an entry time of a given packet to the physical location;
 a second transparent clock adaptor coupled to a second one of the network devices and operative to determine an exit time of a given packet from the physical location; and
 an auxiliary synchronization connection allowing the first transparent clock adaptor to communicate with the second transparent clock adaptor;
 wherein the second transparent clock adaptor adjusts a correction field of the given packet based on the entry time and the exit time;

wherein the first transparent clock adaptor is interconnected with the second transparent clock adaptor in an auxiliary network;
wherein the physical location comprises a segment of a network comprising one or more network devices whose physical arrangement allows for convenient interconnection with the auxiliary network;
wherein the auxiliary network comprises transparent clock adaptors at one or more network ports of the one or more network devices of the physical location which connect the physical location with one or more other segments of the network; and
wherein transparent clock adaptors are coupled to network ports of only a subset of the plurality of network devices at the physical location.

2. The communication system of claim 1, wherein a given one of the first transparent clock adaptor and the second transparent clock adaptor comprises:
a network port for coupling to a link of the network;
a local port for coupling to a port of a given one of the first and second network devices;
transparent clock processing circuitry operative to perform one or more transparent clock timing adjustment operations for each of a plurality of packets including at least one packet arriving in the adaptor via the network port and at least one packet arriving in the adaptor via the local port; and
a synchronization interface for communicating with a corresponding synchronization interface of at least one other transparent clock adaptor.

3. The communication system of claim 2 wherein said given one of the first transparent clock adaptor and the second transparent clock adaptor is operative as an ingress adaptor for a given one of the packets relative to the other one of the first transparent clock adaptor and the second transparent clock adaptor which is operative as an egress adaptor for the given packet.

4. The communication system of claim 3 wherein said transparent clock timing adjustment operations comprise determining an entry time of the given packet to the physical location comprising the network device.

5. The communication system of claim 4 wherein the entry time is determined by the ingress adaptor based on an arrival timestamp indicating an arrival time of the given packet in the ingress adaptor.

6. The communication system of claim 4 wherein said transparent clock timing adjustment operations further comprise communicating the entry time from the ingress adaptor to the egress adaptor.

7. The communication system of claim 6 wherein said entry time is communicated from the ingress adaptor to the egress adaptor by adjusting a correction field of the given packet based on the entry time.

8. The communication system of claim 7 wherein the ingress adaptor adjusts the correction field of the given packet by replacing a current value of the correction field with a new value that is obtained by subtracting the entry time from the current value.

9. The communication system of claim 6 wherein said entry time is communicated from the ingress adaptor to the egress adaptor using a designated field of the given packet other than a correction field of that packet.

10. The communication system of claim 6 wherein said entry time is communicated from the ingress adaptor to the egress adaptor via their respective synchronization interfaces.

11. The communication system of claim 2 wherein said given one of the first transparent clock adaptor and the second transparent clock adaptor is operative as an egress adaptor for a given one of the packets relative to the other one of the first transparent clock adaptor and the second transparent clock adaptor which is operative as an ingress adaptor for the given packet.

12. The communication system of claim 11 wherein said transparent clock timing adjustment operations comprise determining an exit time of the given packet from a designated physical location comprising the network device.

13. The communication system of claim 12 wherein the exit time is determined by the egress adaptor based on an arrival timestamp indicating an arrival time of the given packet in the egress adaptor.

14. The communication system of claim 12 wherein said transparent clock timing adjustment operations further comprise adjusting a correction field of the given packet based on the exit time.

15. The communication system of claim 14 wherein the egress adaptor adjusts the correction field of the given packet by replacing a current value of the correction field with a new value that is obtained by adding the exit time to the current value.

16. The communication system of claim 14 wherein said correction field is adjusted based on the exit time and an entry time of the given packet as determined by the ingress adaptor and communicated from the ingress adaptor to the egress adaptor.

17. The communication system of claim 2 wherein said given one of the first transparent clock adaptor and the second transparent clock adaptor comprises a processor coupled to a memory, and the transparent clock timing adjustments are performed at least in part under control of software code that is stored in the memory and executed by the processor.

18. A computer program product comprising a non-transitory processor-readable storage medium having embodied therein executable program code that when executed by a processor of said given one of the first transparent clock adaptor and the second transparent clock adaptor of claim 2 causes the adaptor to perform said one or more transparent clock timing adjustments.

19. The communication system of claim 1 wherein the one or more network ports of the physical location which have associated transparent clock adaptors comprise network ports expected to carry timing traffic.

20. A method comprising:
identifying a particular physical location, wherein the physical location comprises a segment of a network comprising two or more network devices whose physical arrangement allows for convenient interconnection with an auxiliary network;
inserting one or more transparent clock adaptors at one or more network ports of at least one network device of the physical location which connects the physical location with one or more other segments of the network; and
interconnecting the one or more transparent clock adaptors in an auxiliary network;
wherein the auxiliary network comprises transparent clock adaptors coupled to network ports of only a subset of the two or more network devices at the physical location.

21. The method of claim 20 further comprising:
determining in an ingress transparent clock adaptor one of the one or more transparent clock adaptors an entry time of a given packet to the physical location;
determining in an egress transparent clock adaptor one of the one or more transparent clock adaptors an exit time of the given packet from the physical location; and adjusting a correction field of the given packet based on the entry time and the exit time.

22. The method of claim 21 wherein the ingress transparent clock adaptor has a network port coupled to a first network link and a local port coupled to a port of a first one of the network devices of the physical location, and the egress transparent clock adaptor has a network port coupled to a second network link and a local port coupled to a port of a second one of the network devices of the physical location.

\* \* \* \* \*